Patented Aug. 28, 1928.

1,682,728

UNITED STATES PATENT OFFICE.

WILLIAM P. ter HORST, OF AKRON, OHIO, ASSIGNOR TO THE RUBBER SERVICE LABORATORIES COMPANY, OF AKRON, OHIO, A CORPORATION OF OHIO.

PROCESS OF MANUFACTURING VULCANIZED RUBBER AND THE PRODUCT OBTAINED THEREBY.

No Drawing. Application filed August 4, 1927. Serial No. 210,712.

The present invention relates to the manufacture of vulcanized rubber by a process wherein there are employed as accelerators of the vulcanization step, compounds obtained by combining the carbon disulphide derivatives of primary and secondary amines with the reaction products of mercaptothiazoles and the chlorine derivatives of carbon disulphide, sulphur or sulphur dioxide. The manufacture of the preferred class of accelerating compounds and the use of these compounds in a rubber mix will be readily understood from the following description and examples.

Certain mercapto-aryl-thiazole compounds, such as mercapto-benzo-thiazole, and metallic salts thereof, and its disulphide, heretofore have been described as providing a class of vulcanization accelerators capable of imparting certain desirable properties to a rubber mix and furthermore capable of producing such a rubber product in a relatively short vulcanization period. It has now been found that a rubber product possessing greatly enhanced properties results after an equally short vulcanization period by replacing mercapto-benzo-thiazole or its known derivatives with certain reaction products thereof of a type hereinafter set forth.

The amine salts of alkyl-di-thiocarbamic acids, as are well known, are produced by the action of carbon disulphide on primary and secondary amines. It has now been found that such salts can be combined with the products obtained by reacting mercaptothiazoles with the chlorine derivatives of carbon disulphide, of sulphur, or of sulphur dioxide, to produce stable compounds. Such compounds have been found to be active as accelerators of vulcanization when employed in a rubber mix and produce rubber products in a short period of time that possess high tensile strengths and other highly desirable characteristics required in commercial products.

The compounds of the type comprising the subject-matter of the present invention are preferably manufactured according to the following example, although other modes of reacting the ingredients set forth, as well as other analogous substances, may be followed. Substantially equal weights of piperidine-pentamethylene-di-thiocarbamate and of a reaction product of substantially equi-molecular proportions of thiophosgene and sodium mercapto-benzo-thiazole were added to a quantity of hot benzol or other suitable solvent material, preferably anhydrous, and the mass maintained at a temperature of approximately 60 to 70° C. for a period of time sufficient to permit the reaction to be completed. From four to six hours heating were sufficient for the temperature conditions given but a longer or shorter period is necessary at lower or higher temperatures respectively. Thiophosgene and other analogous reaction products of mercapto compounds, manufactured by the reaction of other than equi-molecular proportions of the respective compounds, have been reacted in a like manner with carbon disulphide derivatives of the amines.

As the reaction hereinbefore described proceeds, piperidine hydrochloride precipitates out while the reaction product desired remains in solution in the solvent employed. In order to permit all the piperidine hydrochloride to precipitate, it was found desirable, after the reaction had been completed, to allow the mass to cool down and stand undisturbed for some time. Thereupon the mass was filtered and the filtrate, containing the desired reaction product, was evaporated nearly to dryness. The remaining portion of solvent was then removed preferably by vacuum drying. The residual brown mass comprising the product desired, is soluble in chloroform, and other solvents. The reaction product has also been obtained by simply heating together while agitating, the amine salt of an alkyl-di-thiocarbamic acid with a substantially equal weight or other proportion of the thiophosgene reaction product of sodium mercapto-benzo-thiazole. Other similarly constituted products can likewise be prepared. Thus the carbon disulphide reaction product of ethylamine, diethylamine, propylamine, butylamine and other aliphatic primary and secondary amines can be used in place of piperidine mentioned in the example set forth. These carbon disulphide derivatives of the amines can also be combined in other than equal proportions by weight with the thiophosgene, the per-chlor-methyl-mercaptan (CSCl$_4$), the sulphur chloride and other chlor sulphur compounds, as well as with the methylene-chloride, and like reaction products of mercapto-benzo-thiazole, its metallic salts, particularly its sodium salt, and of similar derivatives of other mercapto-aryl-thiazoles, thio-phenol and di-mercaptans such as the mercapto derivatives of penthiophene.

The activity of the compounds hereinbefore described is shown by the following example. A rubber mix was prepared in the usual manner comprising 100 parts of smoked sheet rubber,
5 parts of zinc oxide,
2.5 parts of sulphur,
0.1 part accelerator.

As an accelerator there was employed the compound obtained by combining piperidine-penta-methylene di-thiocarbamate with the reaction product of thiophosgene with sodium mercapto-benzo-thiazole. Other mixers were likewise prepared in which the quantity of accelerator used in the example was replaced by 0.2 and by 0.3 parts respectively of the same accelerator. The rubber mixes were then vulcanized by heating the rubber stocks in a press for the times and at the pressure conditions indicated in the table.

| Parts accelerator | Time of cure | Modulus of elasticity at elongation of— | | | Tensile in lbs./in.² at break | Ultimate elongation |
|---|---|---|---|---|---|---|
| | | 300% | 500% | 700% | | |
| 0.1<br>0.2<br>0.3 | 30 minutes at 10 lbs. steam pressure. | No cure.<br>42<br>114 | <br>91<br>259 | <br>164<br>950 | <br>735<br>2465 | <br>985<br>825 |
| 0.1<br>0.2<br>0.3 | 40 minutes at 10 lbs. steam pressure. | 32<br>120<br>212 | 67<br>213<br>400 | 129<br>721<br>1995 | 416<br>2590<br>2870 | 1250<br>910<br>820 |
| 0.1<br>0.2<br>0.3 | 50 minutes at 10 lbs. steam pressure. | 43<br>155<br>240 | 85<br>318<br>496 | 163<br>1080<br>2250 | 1195<br>3490<br>4720 | 1175<br>900<br>840 |
| 0.1<br>0.2<br>0.3 | 1 hour at 10 lbs. steam pressure. | 83<br>200<br>255 | 123<br>365<br>535 | 244<br>1370<br>2270 | 1565<br>3850<br>4595 | 1050<br>880<br>830 |

It is apparent that the accelerators of the preferred type as set forth herein are rapid in action and produce a vulcanized product of unusually high quality, as is well illustrated by the cure at 50 minutes.

The following example illustrates the accelerating power of the compounds comprising the subject-matter of the present invention as compared with certain other accelerators. A stock comprising 100 parts of pale crepe rubber,
5 parts of zinc oxide,
3.5 parts of sulphur,
0.5 parts of accelerator, was mixed in the usual manner. Three such rubber compounds where prepared, one containing the specified proportions of mercapto-benzo-thiazole (indicated below as A), a second containing di-phenyl-guanidine (B below), and the third containing the piperidine pentamethylene di-thiocarbamate reaction product of thiophosgene with sodium mercapto-benzo-thiazole (C below). The three stocks were then vulcanized by heating in a mold under the pressures indicated and the physical characteristics of the vulcanized samples were then determined. The following results were thereby obtained:

| Accelerator | Time of cure | Modulus of elasticity at elongation of— | | | Tensile at break in lbs./in.² | Ultimate elongation |
|---|---|---|---|---|---|---|
| | | 300% | 500% | 700% | | |
| A<br>B<br>C | 30 minutes at 20 lbs. steam. | 121<br>51<br>373 | 246<br>89<br>1245 | 870<br>216<br>4620 | 2720<br>1250<br>4655 | 915<br>1025<br>705 |
| A<br>B<br>C | 45 minutes at 20 lbs. steam. | 106<br>57<br>354 | 239<br>121<br>1120 | 879<br>392<br>4125 | 3065<br>1405<br>4650 | 885<br>970<br>730 |
| A<br>B<br>C | 15 minutes at 40 lbs. steam. | 123<br>86<br>302 | 230<br>169<br>825 | 738<br>470<br>3510 | 2470<br>2095<br>4320 | 905<br>965<br>735 |
| A<br>B<br>C | 30 minutes at 40 lbs. steam. | 130<br>131<br>252 | 272<br>300<br>602 | 810<br>1165<br>2380 | 3060<br>3140<br>3650 | 915<br>875<br>785 |

The above table shows that mercapto-benzo-thiazole and di-phenyl-guanidine are both inferior in accelerating action to the new type of accelerator set forth in this invention. The superiority of the new accelerator is most marked at those cures run for shorter times under the lower vulcanization temperatures.

The new type of accelerator has also been tested in a rubber formula typical of a commercial tread stock. Such a compound comprises 36.5 parts of smoked sheet rubber,
20 parts of No. 2 amber rubber,
11 parts of zinc oxide,
2. parts of carbon black,
3.5 parts of mineral rubber,
1 part of a blended mineral and vegetable oil,
2 parts of sulphur,
0.375 parts of accelerator.

As an accelerator there was used the piperidine pentamethylene-di-thiocarbamate reaction product of a compound resulting from the union of thiophosgene with sodium mercapto-benzo-thiazole (B below). A similar mix was prepared in which 0.5 parts of mercapto-benzo-thiazole (A below) replaced the proportion of accelerator set forth above. The two rubber stocks so obtained were then vulcanized and tested and the following results obtained:

| Accelerator | Time of cure | Modulus of elasticity at elongation of— | | | Tensile at break in lbs./in.$^2$ | Ultimate elongation |
|---|---|---|---|---|---|---|
| | | 300% | 500% | 700% | | |
| A<br>B | 1 hour at 40 lbs. steam pressure. | 1024<br>1235 | 2310<br>2785 | ------ | 3240<br>3475 | 650<br>575 |
| A<br>B | 1½ hours at 40 lbs. steam pressure. | 1030<br>1230 | 2310<br>2745 | ------ | 2880<br>3425 | 605<br>600 |

It is evident from the above comparison, that in the tread stock tested, the new type of accelerators are faster in action and produce a better quality product than does mercapto-benzo-thiazole, even when a greater proportion of the latter accelerator is employed, than of the former.

A hard rubber stock was prepared comprising 20 parts of smoked sheet rubber,
20 parts of No. 2 amber rubber,
5 parts of lime,
17.5 parts of zinc oxide,
27.5 parts of sulphur,
10 parts of mineral rubber,
0.375 parts of one of the new accelerators set forth herein.

The above stock was found to produce a good hard rubber after vulcanizing for approximately two hours and forty-five minutes at a temperature of 289° F.

The various examples hereinbefore set forth are to be understood as illustrative only and not at all limitative of the scope of my invention. Other examples of various types of rubber compounds wherein different proportions of the compounding ingredients employed or of other ingredients, including accelerators, are apparent to those skilled in the art to which the invention pertains. The invention furthermore is to be understood as not limited by any theories advanced by way of explanation of the chemical changes involved in the manufacture of the accelerators nor to the proportions of reacting substances, temperatures employed or other variable conditions set forth in describing the means of producing the accelerators, but is limited solely by the claims appended hereto as a part of this specification, wherein I intend to claim all novelty inherent in my invention as broadly as the prior art permits.

What I claim is:

1. The process of manufacturing vulcanized rubber which comprises combining with rubber a vulcanizing agent in the presence of a small proportion of an accelerating compound formed by combining the carbon disulphide derivative of an amine with the reaction product of a mercapto-thiazole compound upon a chlorine derivative of carbon disulphide.

2. The process of manufacturing vulcanized rubber which comprises combining with rubber a vulcanizing agent in the presence of a small proportion of an accelerating compound formed by combining the $CS_2$ derivative of an aliphatic amine with the reaction product of a mercapto-thiazole compound upon a chlorine derivative of carbon disulphide.

3. The process of manufacturing vulcanized rubber which comprises combining with rubber a vulcanizing agent in the presence of a small proportion of an accelerating compound formed by combining a carbon disulphide derivative of an aliphatic secondary amine with the reaction product of a mercapto-thiazole compound upon a chlorine derivative of carbon disulphide.

4. The process of manufacturing vulcanized rubber which comprises combining with rubber a vulcanizing agent in the presence of a small proportion of an accelerating compound formed by combining an amine salt of an alkyl-di-thio-carbamic acid with the reaction product of a mercapto-thiazole compound upon a chlorine derivative of carbon disulphide.

5. The process of manufacturing vulcanized rubber which comprises combining with rubber a vulcanizing agent in the presence of a small proportion of an accelerating compound formed by combining the piperidine salt of an alkyl di-thio-carbamic acid with the reaction product of a mercapto-thiazole compound upon a chlorine derivative of carbon disulphide.

6. The process of manufacturing vulcanized rubber which comprises combining with rubber a vulcanizing agent in the presence of a small proportion of an accelerating compound formed by combining piperidine-pentamethylene di-thiocarbamate with the reaction product of a mercapto-thiazole compound upon a chlorine derivative of carbon disulphide.

7. The process of manufacturing vulcanized rubber which comprises combining with rubber a vulcanizing agent in the presence of a small proportion of an accelerating compound formed by combining the carbon disulphide derivative of an amine with the reaction product of a metallic salt of a mercapto-aryl-thiazole upon thiophosgene.

8. The process of manufacturing vulcanized rubber which comprises combining with rubber a vulcanizing agent in the presence of a small proportion of an accelerating compound formed by combining the carbon disulphide derivative of an aliphatic amine with the reaction product of a metallic salt of a mercapto-aryl-thiazole upon thiophosgene.

9. The process of manufacturing vulcanized rubber which comprises combining with rubber a vulcanizing agent in the presence of a small proportion of an accelerating compound formed by combining the carbon disulphide derivative of an aliphatic secondary amine with the reaction product of a metallic salt of a mercapto-aryl-thiazole compound upon thiophosgene.

10. The process of manufacturing vulcanized rubber which comprises combining with rubber a vulcanizing agent in the presence of a small proportion of an accelerating compound formed by combining an amine salt of an alkyl di-thio-carbamic acid with the reaction product of a metallic salt of a mercapto-aryl-thiazole compound upon thiophosgene.

11. The process of manufacturing vulcanized rubber which comprises combining with rubber a vulcanizing agent in the presence of a small proportion of an accelerating compound formed by combining the piperidine salt of an alkyl di-thio-carbamic acid with the reaction product of a metallic salt of a mercapto-aryl-thiazole compound upon thiophosgene.

12. The process of manufacturing vulcanized rubber which comprises combining with rubber a vulcanizing agent in the presence of a small proportion of an accelerating compound formed by combining piperidine-pentamethylene di-thio-carbamate with the reaction product of a metallic salt of a mercapto-aryl-thiazole compound upon thiophosgene.

13. The process of manufacturing vulcanized rubber which comprises combining with rubber a vulcanizing agent in the presence of a small proportion of an accelerating compound formed by combining the carbon disulphide derivative of an amine with the reaction product of sodium mercapto-benzo-thiazole upon thiophosgene.

14. The process of manufacturing vulcanized rubber which comprises combining with rubber a vulcanizing agent in the presence of a small proportion of an eccelerating compound formed by combining the carbon disulphide derivative of an aliphatic amine with the reaction product of sodium mercapto-benzo-thiazole upon thiophosgene.

15. The process of manufacturing vulcanized rubber which comprises combining with rubber a vulcanizing agent in the presence of a small proportion of an accelerating compound formed by combining the carbon disulphide derivative of an aliphatic secondary amine with the reaction product of sodium mercapto-benzo-thiazole upon thiophosgene.

16. The process of manufacturing vulcanized rubber which comprises combining with rubber a vulcanizing agent in the presence of a small proportion of an accelerating compound formed by combining an amine salt of an alkyl-di-thio-carbamic acid with the reaction product of sodium mercapto-benzo-thiazole upon thiophosgene.

17. The process of manufacturing vulcanized rubber which comprises combining with rubber a vulcanizing agent in the presence of a small proportion of an accelerating compound formed by combining the piperidine salt of an alkyl-di-thio-carbamic acid with the reaction product of sodium mercapto-benzo-thiazole upon thiophosgene.

18. The process of manufacturing vulcanized rubber which comprises combining with rubber a vulcanizing agent in the presence of a small proportion of an accelerating compound formed by combining piperidine-pentamethylene di-thio-carbamate with the reaction product of sodium mercapto-benzo-thiazole upon thiophosgene.

19. The process of manufacturing vulcanized rubber which comprises combining with rubber a vulcanizing agent in the presence of a small proportion of an accelerating compound formed by combining piperidine-pentamethylene di-thio-carbamate with di-thiazyl-tri-thio-carbonate.

20. The vulcanized rubber product obtained by treating rubber with a vulcanizing agent in the presence of an accelerator, said accelerator comprising the carbon disulphide derivative of an amine with the reaction product of a mercapto-thiazole compound upon a chlorine derivative of carbon disulphide.

21. The vulcanized rubber product obtained by treating rubber with a vulcanizing agent in the presence of an accelerator, said accelerator comprising the carbon disulphide derivative of an aliphatic amine with the reaction product of a mercapto-thiazole compound upon a chlorine derivative of carbon disulphide.

22. The vulcanized rubber product obtained by treating rubber with a vulcanizing agent in the presence of an accelerator, said accelerator comprising the carbon disulphide derivative of an aliphatic secondary amine with the reaction product of a mercapto-thiazole compound upon a chlorine derivative of carbon disulphide.

23. The vulcanized rubber product obtained by treating rubber with a vulcanizing agent in the presence of an accelerator, said accelerator comprising an amine salt of an alkyl-di-thio-carbamic acid with the reaction product of a metallic salt of a mercapto-aryl-thiazole compound upon thiophosgene.

24. The vulcanized rubber product obtained by treating rubber with a vulcanizing agent in the presence of an accelerator, said accelerator comprising the piperidine salt of an alkyl-di-thio-carbamic acid with the reaction product of the sodium salt of a mercapto-aryl-thiazole compound upon thiophosgene.

25. The vulcanized rubber product obtained by treating rubber with a vulcanizing agent in the presence of an accelerator, said accelerator comprising piperidine-pentamethylene di-thio-carbamate with the reaction product of sodium mercapto-benzo-thiazole upon thiophosgene.

26. The vulcanized rubber product obtained by treating rubber with a vulcanizing agent in the presence of an accelerator, said accelerator comprising piperidine-pentamethylene di-thio-carbamate with the reaction product of substantially equi-molecular proportions of sodium mercapto-benzo-thiazole upon thiophosgene.

27. The process of manufacturing vulcanized rubber which comprises combining with rubber a vulcanizing agent in the presence of a small proportion of an accelerating compound formed by combining the carbon disulphid derivative of an amine with the reaction product of a mercaptan upon a chlorine derivative of carbon disulphide.

28. The process of manufacturing vulcanized rubber which comprises combining with rubber a vulcanizing agent in the presence of a small proportion of an accelerating compound formed by combining the carbon disulphide derivative of a secondary aliphatic amine with the reaction product of a mercaptan with thiophosgene.

29. The vulcanized rubber product obtained by treating rubber with a vulcanizing agent in the presence of an accelerator, said accelerator comprising the carbon disulphide derivative of an amine with the reaction product of a mercaptan upon a chlorine derivative of carbon disulphide.

30. The vulcanized rubber product obtained by treating rubber with a vulcanizing agent in the presence of an accelerator, said accelerator comprising the carbon disulphide derivative of a secondary aliphatic amine with the reaction product of a mercaptan and thiophosgene.

In testimony whereof I have affixed my signature.

WILLIAM P. ter HORST.